United States Patent [19]

Lavallee

[11] 4,032,250

[45] June 28, 1977

[54] REAMER CONSTRUCTION

[75] Inventor: John A. Lavallee, Hatfield, Mass.

[73] Assignee: Lavallee & Ide, Inc., Chicopee, Mass.

[22] Filed: Mar. 17, 1976

[21] Appl. No.: 667,687

[52] U.S. Cl. .................................. 408/59; 408/229
[51] Int. Cl.² ......................................... B23B 51/06
[58] Field of Search ........... 408/59, 705, 226, 229, 408/230, 231, 238

[56] References Cited

UNITED STATES PATENTS

| 1,843,326 | 2/1932 | Knott | 408/59 |
|---|---|---|---|
| 2,372,219 | 3/1945 | Miller | 408/59 |
| 2,867,140 | 1/1959 | Getts | 408/226 X |
| 3,028,772 | 4/1962 | Mossberg | 408/59 |

Primary Examiner—Othell M. Simpson
Assistant Examiner—Z. R. Bilinsky
Attorney, Agent, or Firm—Chapin, Neal and Dempsey

[57] ABSTRACT

A reamer having an internal coolant passage therethrough and a fluid dispersing member slidingly disposed in said passage, said dispersing member having a lower portion which extends from a point within said reamer to a point outside of said reamer, whereby said dispersing member is displaceable into the coolant passage upon contact by said lower portion with the bottom of a hole being reamed.

4 Claims, 4 Drawing Figures

REAMER CONSTRUCTION

BACKGROUND

The present invention relates to reamers. In particular, it relates to a reamer construction which provides for efficient cooling and lubricating thereof when in use.

Reamers are generally considered to be multiple-cutting-edge tools which are used to enlarge or finish drilled holes in order to give accurate dimensions thereto as well as a good finish. While there are various types of reamers, the fluted reamers, i.e., straight or helically fluted, are the most common.

In the reaming operation of steel parts, it is desirable to employ a cutting fluid, which acts as a lubricant or coolant, in order to facilitate the cutting operation performed by the reamer. To this end, the instant invention employs displaceable fluid dispersing means within the reamer body or shank which normally extends from a point within the reamer to a point beyond the end of the reamer and which channels a coolant into contact with the leading edges of the flutes of the reamer and the surrounding workpiece. Said displaceable fluid dispersing means may be pushed back into the body of the reamer by contact with the bottom of a hole being reamed.

Accordingly, it is an object of the present invention to provide a reamer having a unique cooling and/or lubricating system in the form of an internal coolant passage and a displaceable fluid dispersing member disposed therein.

It is another object of the present invention to provide a reamer with an internal coolant passage and a displaceable fluid dispersing member therein which directs coolant flow at the leading edges of the reamer flutes.

It is a further object of the present invention to provide a reamer design which offers improved tip cooling for the reamer.

The above and other objects and advantages will become apparent in view of the following disclosure when considered with the drawings, in which.

Figure 1:
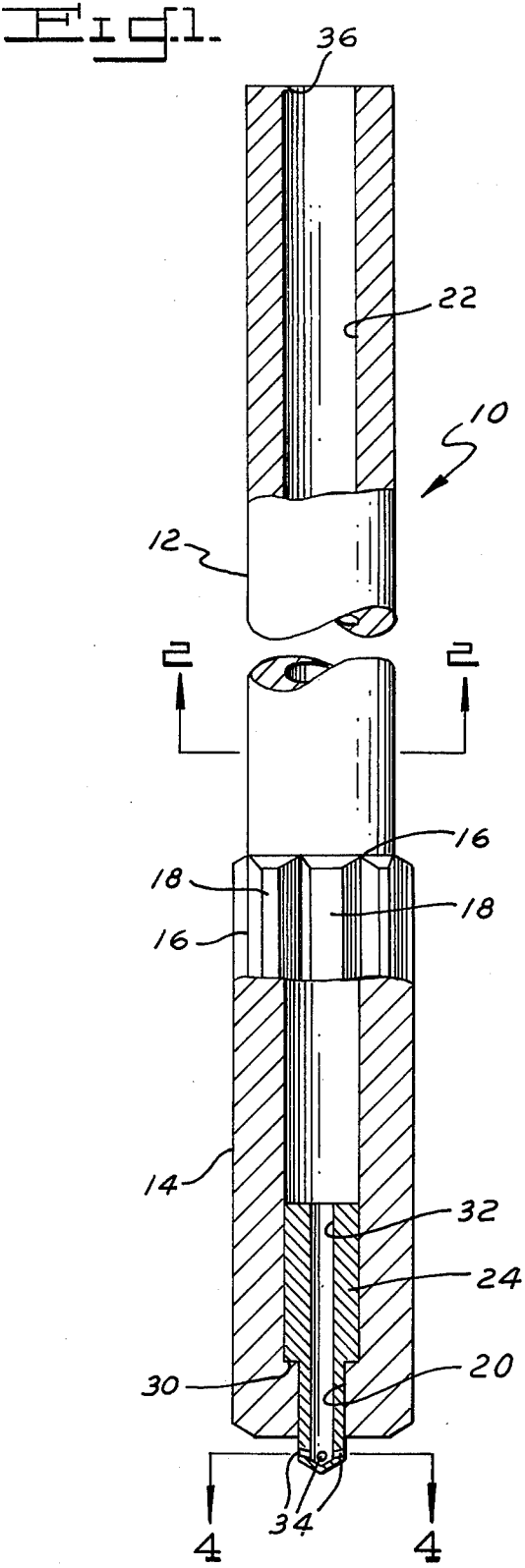
FIG. 1 is an elevation view of the reamer of the present invention having sections broken away.
Figure 2:
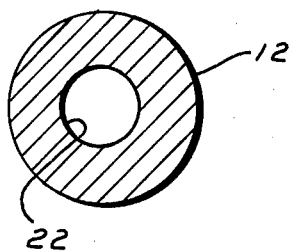
FIG. 2 is a section taken along the line 2—2 of FIG. 1.

With reference to the drawings, it will be seen in FIG. 1 that the reamer of the present invention is identified at 10. The reamer 10 may be generally described as having a shank 12 and a cutting end 14 comprised of flutes 16 and lands 18. As further shown, the reamer 10 is provided with a pilot hole 20 disposed in the cutting end 14. Said pilot hole 20 opens into an enlarged axial bore 22 which runs throughout the remainder of the reamer shank 12.

Figure 3:
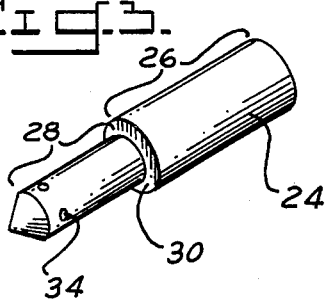
FIG. 3 is a perspective view of the cutting fluid dispersing member seen in FIG. 1.
Figure 4:
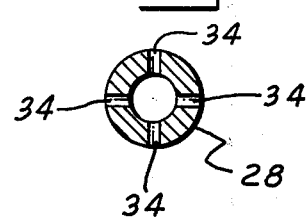
FIG. 4 is a section view taken along the line 4—4 of FIG. 1.

With reference to FIGS. 1 and 3, it will be noted that the reamer 10 is also provided with a fluid dispersing member 24. Said member 24 is basically cylindrical in shape and comprises an upper or guide portion 26 and a somewhat smaller in diameter lower portion or extension 28. The intersection of said two portions forms shoulder 30. A fluid feeding hole 32 is axially disposed in the upper portion 26 of said member 24 and extends downwardly therethrough into said extension 28 terminating therein just slightly above the end thereof. As best seen in FIGS. 1, 3 and 4, the end of said extension 28 is provided with a plurality of fluid diverting passages 34 spaced about the periphery of said extension 28. Said holes 34 extend substantially radially outwardly and communicate with the fluid feeding hole 32. As further shown, the passages 34 are included rearwardly so as to direct cutting fluid at the leading edges of the flutes.

The fluid dispersing member 24 is slidably disposed in the axial bore 22 of the reamer 10 and the lower portion 28 thereof extends through the pilot hole 20 to a point outside of the reamer 10. As should be clear, the lower portion 28 is of such length that the holes 34 are positioned outside the reamer 10 when the shoulder 30 of member 24 is seated against the bottom of axial bore 22.

When the reamer of the present invention is being used in its intended fashion, the upper end thereof is securely clamped in a chuck mechanism and coolant from an outside source, usually in the form of a liquid, is supplied to the axial bore 22 which acts as the main coolant passage. Said coolant forces the dispersing member 24 to its lowermost point within the passage 22 and also feeds the fluid feeding hole 32 in member 24. Ultimately, the coolant is sprayed onto the leading edges of the reamer 10 by passage through fluid feeding hole 32 and passages 34 in said member 24.

When the reamer 10 is used to ream a hole having a bottom, the reamer may be advanced all the way to the bottom without fear of interference with the operation by the lower portion 28 of the dispersing member. This is accomplished by the sliding relation of the member 28 within the bore 22 wherein as the reamer is advanced the tip of the said portion 28 contacts the bottom of the hole, thus causing displacement of the member 24 rearwardly up into the reamer shank 12. As will be recognized by those skilled in the art, said dispersing member 24 is freely and wholly displaceable into said reamer shank. Once the area adjacent the bottom of the hole has been reamed and the reamer is withdrawn, the member 24 is urged back into contact with the bottom of the bore 22 by the flow of coolant in the passage 22.

The reamer of the present invention may be manufactured using basic reamer manufacturing techniques. However, as should be clear to those skilled in the art, the fluid dispersing member 24 is separately produced from any suitable cutting fluid and heat resistant material, such as for example nylon or other plastic material. Once the axially disposed pilot hole and coolant passage have been cut into the shank 12 of the reamer 10, the fluid dispersing member 24 is inserted into the top opening of said passage 22 and allowed to fall into place in the bottom thereof. The member 24 may be retained in the coolant passage 22 by burring the periphery of said passage, such as shown at 36.

That which is claimed is:

1. In a reamer comprising a shank and a cutting portion adjacent one end thereof, the improvement which comprises a pilot hole axially disposed in said shank in the cutting portion end thereof, a fluid passage axially disposed throughout the remainder of said shank communicating with said pilot hole, and fluid dispersing means disposed in said fluid passage and having a portion thereof extending through said pilot hole to a point outside of said shank said dispersing means being freely and wholly displaceable into said shank.

2. The reamer of claim 1 wherein said displaceable fluid dispersing means comprises a member having an upper portion and a lower portion, said upper portion being wholly disposed in said fluid passage of said shank and said lower portion extending from a point within said shank to a point outside of said shank through said pilot hole.

3. The reamer of claim 2 wherein said member has a fluid feeding hole axially disposed therein, said hole terminating in said lower portion adjacent the end thereof, and a plurality of fluid diverting passages communicating with said fluid feeding hole, said passages extending substantially radially outwardly and inclined rearwardly so that when said member is positioned in said shank at its lowermost point fluid passing through said shank is directed at the leading edges of said reamer cutting portion.

4. The reamer of claim 3 wherein said member is displaceable rearwardly into said shank when said lower portion contacts the bottom of a hole being reamed.

* * * * *